Figure 1:
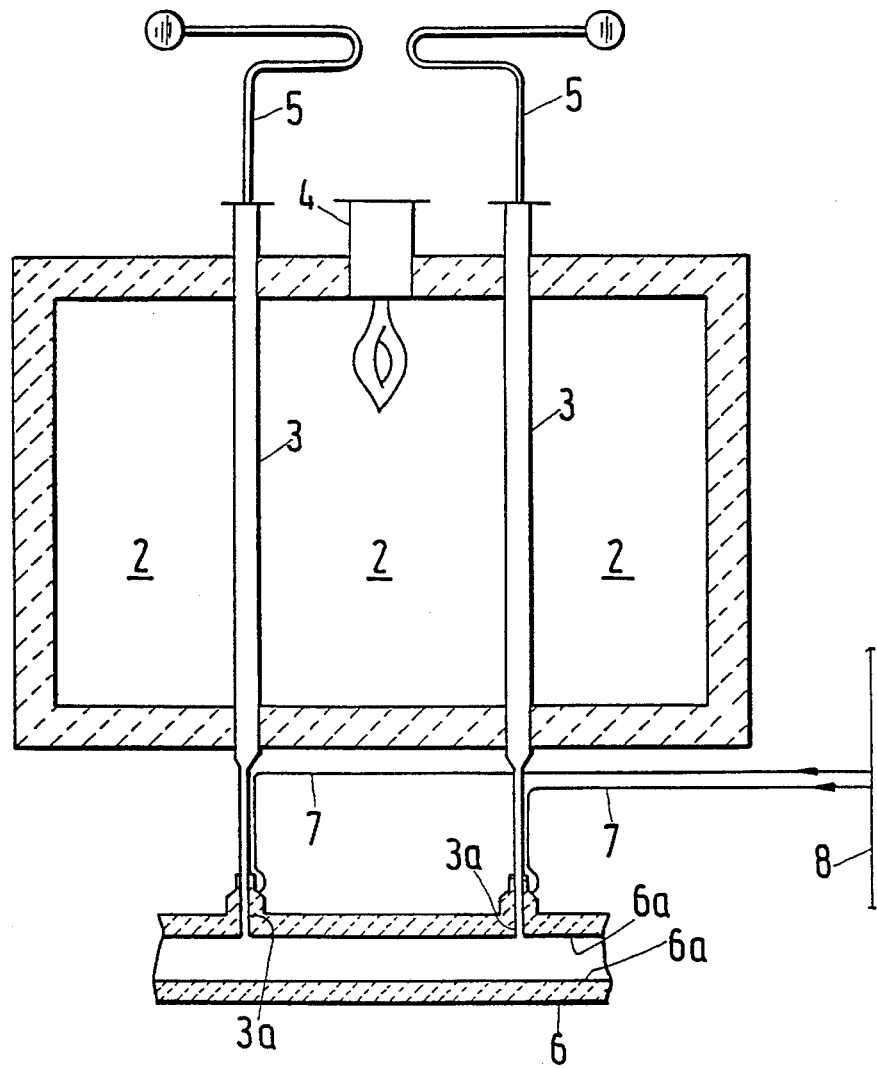

United States Patent [19]

Hohmann et al.

[11] Patent Number: 5,490,974
[45] Date of Patent: Feb. 13, 1996

[54] TUBULAR HEATER FOR PREPARING CARBON MONOXIDE-CONTAINING GAS MIXTURES

[75] Inventors: Friedrich Hohmann, Langen; Werner Röll, Freigericht; Hans G. Mörtel, Frankfurt, all of Germany

[73] Assignee: Metallgesellschaft Aktiengesellschaft, Frankfurt, Germany

[21] Appl. No.: 281,058

[22] Filed: Jul. 27, 1994

[30] Foreign Application Priority Data

Aug. 13, 1993 [DE] Germany ................... 43 27 176.6

[51] Int. Cl.⁶ ................ B01J 8/04; F23D 11/38; F27D 23/00
[52] U.S. Cl. .................. 422/197; 422/198; 422/203; 422/312; 431/121; 432/75
[58] Field of Search ................. 422/197, 203, 422/312, 198; 431/121; 432/75

[56] References Cited

U.S. PATENT DOCUMENTS

| | | | |
|---|---|---|---|
| 2,915,367 | 12/1959 | Olson et al. | 423/75 |
| 3,607,125 | 9/1971 | Kydd | 422/197 |
| 3,897,471 | 7/1975 | Herbert et al. | 260/449.5 |
| 4,324,649 | 4/1982 | Parizot et al. | 208/130 |
| 4,336,229 | 6/1982 | Wunderlich et al. | 422/148 |
| 4,647,436 | 3/1987 | Herbort et al. | 422/197 |
| 4,830,091 | 5/1989 | Dierke et al. | 165/1 |
| 4,853,190 | 8/1989 | Manner et al. | 422/197 |
| 4,999,089 | 3/1991 | Nakase et al. | 196/110 |
| 5,283,049 | 2/1994 | Fluder et al. | 422/198 |
| 5,362,453 | 11/1994 | Marsch | 422/197 |
| 5,399,321 | 3/1995 | Sosna et al. | 422/197 |

FOREIGN PATENT DOCUMENTS

| | | |
|---|---|---|
| 0171583 | 2/1986 | European Pat. Off. . |
| 0258907 | 3/1988 | European Pat. Off. . |
| 1542160 | 7/1970 | Germany . |
| 4327176 | 1/1995 | Germany . |

OTHER PUBLICATIONS

Hydrocarbon Processing, vol. 51, No. 8, pp. 73–75, Aug. 1972.
Chemical Engineering, vol. 93, No. 1, pp. 83–87, Jan. 6, 1986.
Norman E. Hamner, Proceedings of the Fourth International Congress on Metallic Corrosion, pp. 258–263, 1972.
R. F. Hochman, Basic Studies of Metal Deterioration ("Metal Dusting") in Carbonaceous Environments at Elevated Temperatures, pp. 258–263, 1969.
Karl Liebknecht, Spezifische Probleme bei der Entwicklung, Projektierung und Inbetriebnahme von Röhrenöfen für die petrolchemische Industrie, Chem. Techn., 21, Jg., Heft 12, pp. 766–769, Dec. 1969.

Primary Examiner—Timothy M. McMahon
Assistant Examiner—N. Bhat
Attorney, Agent, or Firm—William C. Gerstenzang; Sprung Horn Kramer & Woods

[57] ABSTRACT

The tubular heater comprises numerous tubes, which are disposed in a combustion chamber and contain catalyst. A synthesis gas, which mainly comprises hydrogen, carbon monoxide, and carbon dioxide, is prepared in the tubes. There is a risk of a formation of carbides (metal dusting corrosion) on the outside surface of the outlet ends of the tubes. To prevent such corrosion, a gaseous or vaporous protecting fluid, which is substantially free of CO, is supplied to the region surrounding the outlet ends of the tubes.

7 Claims, 1 Drawing Sheet

TUBULAR HEATER FOR PREPARING CARBON MONOXIDE-CONTAINING GAS MIXTURES

DESCRIPTION

This invention relates to a tubular heater for a catalytic cracking of hydrocarbons in order to prepare a raw synthesis gas, which mainly contains hydrogen, carbon monoxide and carbon dioxide, which heater comprises numerous tubes, which are disposed in a combustion chamber and contain catalyst.

Tubular heaters of that kind are known and serve, e.g., for a catalytic cracking of natural gas to prepare a synthesis gas, which is used, e.g., for the synthesis of methanol. Pressures in the range From 1 to 20 bars are usually maintained in the tubes, and the raw synthesis gas has temperatures between 700° and 1000° C. at the outlet end of the tubes. It has been found that the outlet end of the tube is subjected to a corrosive action which results in the formation of carbides (metal dusting) and by which the metallic material is destroyed.

It is an object of the invention to effectively protect the tubes at their outlet ends, which are susceptible to metal dusting corrosion, and the region adjacent to such outlet ends. In a tubular heater which is of the kind described first hereinbefore this is accomplished in accordance with the invention in that means are provided for supplying a gaseous or vaporous protecting fluid which is substantially free of CO to the outside surface of the outlet ends of at least some of the tubes, which outlet ends are disposed outside the combustion chamber and flown through by raw synthesis gas. That protecting fluid prevents a corrosive action of the CO-containing synthesis gas in the particularly susceptible region around the outlet ends of the tunes. In dependence on the CO content the temperature region in which metal dusting corrosion can take place is between about 500° and 850° C.

At least some of the tubes are preferably provided on the outside of their outlet end with a chamber for receiving a protecting fluid. That chamber usually adjoins a refractory lining, which surrounds the outlet end of the tubes.

Figure 2:
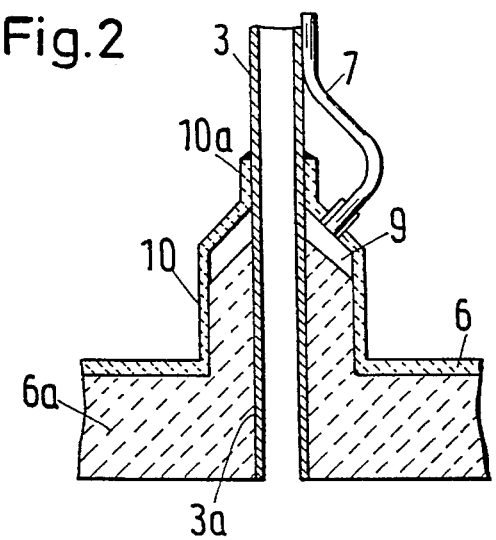

Details of the design of the tubular heater in accordance with the invention will be explained with reference to the drawing, in which FIG. 1 is a schematic horizontal sectional view showing a tubular heater and FIG. 2 is a longitudinal sectional view which shows on a larger scale the outlet end of a tube.

A refractory housing 1 contains a combustion chamber 2, in which numerous vertical tubes 3 are heated from the outside. Heating is effected by a plurality of burners 4, which are supplied, e.g., with natural gas. A mixture which contains hydrocarbons and steam is supplied through supply lines 5 into the tubes 3 and is reacted in the tubes on the catalyst provided therein and consisting, e.g., of a nickel catalyst. A raw synthesis is thus prepared, which mainly contains hydrogen, carbon monoxide, and carbon dioxide. At temperatures from 700° to 1000° C. and preferably of at least 800° C. the synthesis gas flows downwardly in the tubes and exits through the outlet ends 3a into a collecting line 6.

It has been found that particularly the outside surfaces of the outlet ends 3a and their environment are susceptible to metal dusting corrosion, which causes the metal to be destroyed by a formation of carbides. Such carbides are formed by the decomposition of carbon monoxide by the reaction $2\ CO \rightarrow CO_2 + C$, which is particularly intense at temperatures in the range from 500° to 850° C. Temperatures in that range usually occur on the outside surface of the outlet ends 3a and in their environment.

The collecting line 6 is provided on its side surface with a refractory lining 6a, which surrounds also the outlet ends 3a of the tubes 3. Because the refractory lining has a certain porosity, synthesis gas must be expected to diffuse through the refractory lining and synthesis gas at relatively low temperatures reaches the outside surface of the outlet ends 3a so that the above-mentioned corrosion takes place.

In order to protect the outlet ends 3a and their closest environment against the corrosive action resulting in a formation of carbides, each outlet end is provided with a supply line 7, through which a gaseous or vaporous protecting fluid is supplied from a main line 8. The protecting fluid may consist, e.g., of hydrogen, water vapor, nitrogen or $CO_2$.

It is apparent form FIG. 2 how the protecting fluid is conducted through the line 7 into a chamber 9, which is disposed within a bell-shaped enlarged portion 10 of the collecting line 6. The enlarged portion 10 is welded at its top end 10a to the tube 3. The protecting fluid prevents the metal dusting corrosion on the outside surface of the outlet end 3a and on the inside surface of the enlarged portion 10.

The refractory lining 6a of the collecting line 6 surrounds the outlet end 3a of the tube 3. The lining 6a consists, e.g., of a rammed composition and is slightly porous so that the protecting fluid can diffuse out of the chamber 9 through the lining and is finally discharged in the collecting line 6 together with the synthesis gas.

As is apparent from FIGS. 1 and 2 the line 7 which comes from the main line 8 and conducts protecting fluid extends downwardly over a certain distance in contact with the outside surface of the associated tube 3 so that the hot gas inside the tube 3 is used to heat the protecting fluid in the line 7 by an indirect heat exchange and the protecting fluid is at an elevated temperature as it enters the chamber 9. That heating of the protecting fluid prevents thermal stresses adjacent to the outlet end 3a.

We claim:

1. A tubular heater for a catalytic cracking of hydrocarbons in order to prepare a raw synthesis gas which mainly contains hydrogen, carbon monoxide and carbon dioxide, which heater comprises a refractory housing containing a combustion chamber and heating means in said combustion chamber, a plurality of tubes being disposed in said combustion chamber, said tubes containing a catalyst, said catalyst being indirectly heated by said heating means, said tubes having supply means for supplying hydrocarbons and steam into said tubes, said tubes having outlet ends downstream of said catalyst, said outlet ends being disposed outside said combustion chamber through which raw synthesis gas flows, said outlet ends being connected to a collecting line for collecting said raw synthesis gas, the inside surface of said collecting line and the outside surface of said outlet ends being provided with a porous refractory lining, bell-shaped portions of the collecting line being connected to the outside of the least some of said outlet ends, each of said bell-shaped portions being provided with a supply line for supplying a gaseous or vaporous protecting fluid which is substantially free of CO to the outside surface of the outlet end of said portion and into the refractory lining.

2. A tubular heater according to claim 1, wherein at least some of the tubes are equipped with a chamber on the outside of their outlet ends for receiving said protecting fluid.

3. A tubular heater according to claim 1, further characterized in that at least some of the tubes are provided at their outlet end with a refractory lining.

4. A tubular heater according to claim 1, further characterized in that said protecting fluid is supplied to each of said at least some of the tubes through a line which extends over and along a portion of each, through which said synthesis gas passes and which is in physical contact with the outside surface of said tube.

5. In the method of producing synthesis gas by the catalytic cracking of hydrocarbons in a tubular heater, which tubular heater comprises a plurality of tubes passing through a combustion chamber, wherein the hydrocarbons are supplied to the inlet of said tubes, said hydrocarbons being converted to synthesis gas as they pass through said tubes, and exiting the outlet ends of said tubes, and wherein a fuel is burned in said combustion chamber to heat the gases passing through said tubes, and wherein the outlet ends of said tubes are disposed outside said combustion chamber, the improvement which comprises protecting said outlet ends of said tubes and the region adjacent thereto from metal dusting corrosion, by providing a gaseous or vaporous protecting fluid, which is substantially free of CO, to the outside surface of said outlet ends of at least some of said tubes.

6. The method of claim 5, wherein said protecting fluid is selected from the group consisting of hydrogen, water vapor, nitrogen and $CO_2$.

7. The method of claim 6, wherein said hydrocarbons are natural gas.

\* \* \* \* \*